United States Patent
Gupta et al.

(10) Patent No.: US 11,237,872 B2
(45) Date of Patent: Feb. 1, 2022

(54) SEMICONDUCTOR INSPECTION AND METROLOGY SYSTEMS FOR DISTRIBUTING JOB AMONG THE CPUS OR GPUS BASED ON LOGICAL IMAGE PROCESSING BOUNDARIES

(71) Applicant: KLA-TENCOR CORPORATION, Milpitas, CA (US)

(72) Inventors: Ajay Gupta, Santa Clara, CA (US); Sankar Venkataraman, Milpitas, CA (US); Sashi Balasingam, Los Gatos, CA (US); Mohan Mahadevan, Santa Clara, CA (US)

(73) Assignee: KLA-TENCOR CORPORATION, Milpitas, CA (US)

( * ) Notice: Subject to any disclaimer, the term of this patent is extended or adjusted under 35 U.S.C. 154(b) by 346 days.

(21) Appl. No.: 15/978,626

(22) Filed: May 14, 2018

(65) Prior Publication Data

US 2018/0341525 A1    Nov. 29, 2018

Related U.S. Application Data

(60) Provisional application No. 62/509,927, filed on May 23, 2017.

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01); *G06F 9/505* (2013.01)

(58) Field of Classification Search
None
See application file for complete search history.

(56) References Cited

U.S. PATENT DOCUMENTS 6,529,621 B1    3/2003   Glasser et al.
6,614,520 B1    9/2003   Bareket et al.
(Continued)

FOREIGN PATENT DOCUMENTS

WO    2017049496 A1    3/2017

OTHER PUBLICATIONS

ISA/KR, International Search Report and Written Opinion for PCT/US2018/033290 dated Sep. 17, 2018.
(Continued)

*Primary Examiner* — Meng Ai T An
*Assistant Examiner* — Zujia Xu
(74) *Attorney, Agent, or Firm* — Hodgson Russ LLP

(57) ABSTRACT

Real-time job distribution software architectures for high bandwidth, hybrid processor computation systems for semiconductor inspection and metrology are disclosed. The imaging processing computer architecture can be scalable by changing the number of CPUs and GPUs to meet computing needs. The architecture is defined using a master node and one or more worker nodes to run image processing jobs in parallel for maximum throughput. The master node can receive input image data from a semiconductor wafer or reticle. Jobs based on the input image data are distributed to one of the worker nodes. Each worker node can include at least one CPU and at least one GPU. The image processing job can contain multiple tasks, and each of the tasks can be assigned to one of the CPU or GPU in the worker node using a worker job manager to process the image.

13 Claims, 8 Drawing Sheets

(56) References Cited

U.S. PATENT DOCUMENTS

| | | |
|---|---|---|
| 6,748,103 B2 | 6/2004 | Glasser et al. |
| 6,966,047 B1 | 11/2005 | Glasser et al. |
| 7,024,339 B1 | 4/2006 | Bhaskar et al. |
| 7,076,390 B1 | 7/2006 | Bhaskar et al. |
| 7,149,642 B1 | 12/2006 | Bhaskar et al. |
| 7,181,368 B1 | 2/2007 | Bhaskar et al. |
| 7,251,586 B2 | 7/2007 | Bhaskar et al. |
| 7,379,838 B2 | 5/2008 | Bhaskar et al. |
| 7,382,940 B1 | 6/2008 | Bhaskar et al. |
| 7,440,640 B1 | 10/2008 | Bhaskar et al. |
| 7,555,409 B1 | 6/2009 | Bhaskar et al. |
| 7,602,958 B1 | 10/2009 | Bhaskar et al. |
| 7,646,906 B2 | 1/2010 | Saidin et al. |
| 7,689,966 B2 | 3/2010 | Verma et al. |
| 7,691,549 B1 | 4/2010 | Glasser et al. |
| 7,796,804 B2 | 9/2010 | Bhaskar et al. |
| 7,865,037 B1 | 1/2011 | Bhaskar et al. |
| 8,126,255 B2 | 2/2012 | Bhaskar et al. |
| 8,204,296 B2 | 6/2012 | Bhaskar et al. |
| 8,284,394 B2 | 10/2012 | Kirk et al. |
| 8,422,010 B2 | 4/2013 | Kirk et al. |
| 8,645,100 B2 | 2/2014 | Bhaskar et al. |
| 8,754,972 B2 | 6/2014 | Brown et al. |
| 8,823,969 B1 | 9/2014 | Bhaskar et al. |
| 9,176,072 B2 | 11/2015 | Zhao et al. |
| 9,222,771 B2 | 12/2015 | Rosengaus et al. |
| 9,222,895 B2 | 12/2015 | Duffy et al. |
| 9,262,821 B2 | 2/2016 | Shifrin et al. |
| 9,355,208 B2 | 5/2016 | Shifrin et al. |
| 9,462,206 B2 | 10/2016 | Brown et al. |
| 9,576,861 B2 | 2/2017 | Park et al. |
| 9,613,391 B2 | 4/2017 | Bhaskar et al. |
| 2006/0102839 A1 | 5/2006 | Bhaskar et al. |
| 2006/0106580 A1 | 5/2006 | Bhaskar et al. |
| 2006/0242619 A1 | 10/2006 | Pang et al. |
| 2007/0005284 A1 | 1/2007 | Bhaskar et al. |
| 2007/0124095 A1 | 5/2007 | Bhaskar et al. |
| 2008/0013083 A1 | 1/2008 | Kirk et al. |
| 2009/0041332 A1 | 2/2009 | Bhaskar et al. |
| 2009/0080759 A1 | 3/2009 | Bhaskar et al. |
| 2010/0329540 A1 | 12/2010 | Bhaskar et al. |
| 2011/0169944 A1 | 7/2011 | Bhaskar et al. |
| 2012/0124591 A1 | 5/2012 | Cadambi et al. |
| 2013/0028506 A1* | 1/2013 | Salter ................. G01N 21/8851 382/145 |
| 2013/0035877 A1 | 2/2013 | Kirk et al. |
| 2013/0093776 A1* | 4/2013 | Chakraborty ........... G06F 9/505 345/520 |
| 2013/0096873 A1 | 4/2013 | Rosengaus et al. |
| 2013/0147789 A1 | 6/2013 | Kim |
| 2014/0047341 A1 | 2/2014 | Breternitz et al. |
| 2014/0199791 A1 | 7/2014 | Park et al. |
| 2014/0241610 A1 | 8/2014 | Duffy et al. |
| 2014/0337823 A1* | 11/2014 | Sjodin ...................... G06F 8/43 717/144 |
| 2015/0012900 A1 | 1/2015 | Shifrin et al. |
| 2015/0016710 A1 | 1/2015 | Bhaskar et al. |
| 2015/0268177 A1* | 9/2015 | Yokochi ............. G01N 21/9501 356/237.5 |
| 2015/0324964 A1 | 11/2015 | Shifrin et al. |
| 2016/0150191 A1 | 5/2016 | Karsenti et al. |
| 2016/0260241 A1* | 9/2016 | Jin ........................ G06T 15/005 |
| 2016/0378559 A1* | 12/2016 | Bhandarkar .......... G06F 9/5027 718/104 |
| 2017/0083364 A1* | 3/2017 | Zhao ..................... G06F 9/4818 |
| 2017/0140524 A1 | 5/2017 | Karsenti et al. |
| 2017/0148226 A1 | 5/2017 | Zhang et al. |
| 2017/0193400 A1 | 7/2017 | Bhaskar et al. |
| 2017/0193680 A1 | 7/2017 | Zhang et al. |
| 2017/0194126 A1 | 7/2017 | Bhaskar et al. |
| 2017/0200260 A1 | 7/2017 | Bhaskar et al. |
| 2017/0200264 A1 | 7/2017 | Park et al. |
| 2017/0200265 A1 | 7/2017 | Bhaskar et al. |
| 2017/0214927 A1* | 7/2017 | Zenoni .................. H04N 19/156 |
| 2017/0334066 A1* | 11/2017 | Levine ..................... B25J 9/161 |
| 2017/0345140 A1 | 11/2017 | Zhang et al. |
| 2017/0351952 A1 | 12/2017 | Zhang et al. |
| 2018/0001206 A1* | 1/2018 | Osman ................ A63F 13/5375 |
| 2018/0107928 A1 | 4/2018 | Zhang et al. |

OTHER PUBLICATIONS

Github, "TensorFlowOnSpark," retrieved from github.com/yahoo/TensorFlowOnSpark (Apr. 30, 2017).

* cited by examiner

SEMICONDUCTOR INSPECTION AND METROLOGY SYSTEMS FOR DISTRIBUTING JOB AMONG THE CPUS OR GPUS BASED ON LOGICAL IMAGE PROCESSING BOUNDARIES

CROSS-REFERENCE TO RELATED APPLICATIONS

This application claims priority to the provisional patent application filed May 23, 2017 and assigned U.S. App. No. 62/509,927, the disclosure of which is hereby incorporated by reference.

FIELD OF THE DISCLOSURE

This disclosure relates to semiconductor inspection and metrology systems.

BACKGROUND OF THE DISCLOSURE

Evolution of the semiconductor manufacturing industry is placing ever greater demands on yield management and, in particular, on metrology and inspection systems. Critical dimensions continue to shrink. Economics is driving the industry to decrease the time for achieving high-yield, high-value production. Minimizing the total time from detecting a yield problem to fixing it determines the return-on-investment for a semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Defect review typically involves re-detecting defects that were detected by an inspection process and generating additional information about the defects at a higher resolution using either a high magnification optical system or a scanning electron microscope (SEM). Defect review is typically performed at discrete locations on specimens where defects have been detected by inspection. The higher resolution data for the defects generated by defect review is more suitable for determining attributes of the defects such as profile, roughness, or more accurate size information.

Metrology processes are also used at various steps during a semiconductor manufacturing process to monitor and control the process. Metrology processes are different than inspection processes in that, unlike inspection processes in which defects are detected on specimens, metrology processes are used to measure one or more characteristics of the specimens that cannot be determined using currently used inspection tools. For example, metrology processes are used to measure one or more characteristics of specimens such as a dimension (e.g., line width, thickness, etc.) of features formed on the specimens during a process such that the performance of the process can be determined from the one or more characteristics. In addition, if the one or more characteristics of the specimens are unacceptable (e.g., out of a predetermined range for the characteristic(s)), the measurements of the one or more characteristics of the specimens may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on specimens may be independent of the results of an inspection process performed on the specimens. In particular, the locations at which a metrology process is performed may be selected independently of inspection results.

Semiconductor inspection and metrology tools are generally real-time, high-bandwidth embedded systems. Semiconductor inspection and metrology tools do not include job distribution systems that dynamically distribute computational loads across different processor types (e.g., CPUs and GPUs). Semiconductor inspection and metrology tools also do not include hybrid (e.g., CPU and GPU) image processing systems.

Therefore, an improved job distribution architecture is needed for semiconductor inspection and metrology tools.

BRIEF SUMMARY OF THE DISCLOSURE

A system is provided in a first embodiment. The system comprises a plurality of worker nodes and a master node in electronic communication with the plurality of the worker nodes. Each of the worker nodes includes at least one CPU running a worker job manager and at least one GPU in electronic communication with the CPU. The worker job manager is configured to divide a received job into a plurality of tasks. Each of the worker job managers is configured to assign each of the tasks of the received job to one of the CPU or one of the GPU in the worker node. Each of the worker job managers is configured to determine whether to assign one of the tasks to one of the CPU instead of one of the GPU in the worker node or whether to assign one of the tasks to one of the GPU instead of one of the CPU in the worker node. The master node receives input image data about a semiconductor wafer or reticle. The master node is configured to divide the input image data into at least a first job and distribute the first job to one of the worker nodes. Each of the worker job managers is further configured to prioritize the tasks in the first job ahead of tasks in a later job.

There may be more of the CPU than the GPU in one of the worker nodes or there may be more of the GPU than the CPU in one of the worker nodes.

The master node can be further configured to divide the input image data into a second job and to distribute the second job to one of the worker nodes.

The system can include another CPU in one of the worker nodes in electronic communication with the CPU running the worker job manager.

The system can include at least one CPU worker node in electronic communication with the master node. The CPU worker node can include one or more of the CPU without any of the GPU. One of the CPU in the CPU worker node can run the worker job manager.

The system can include at least one GPU worker node in electronic communication with the master node. The GPU worker node can include one or more of the GPU without any of the CPU other than to run the worker job manager.

The system can include an interface layer configured to communicate with an integrated memory controller (IMC) client using an application programming interface.

Each of the worker job managers can include a module with a deep learning model. The deep learning model can be configured to assign each of the tasks in the received job to one of the CPU or one of the GPU in the worker node.

The system can include a neural network in electronic communication with the GPU.

The master node may be in electronic communication with a processing tool. The processing tool includes a semiconductor inspection tool or a semiconductor metrology tool.

A method is provided in a second embodiment. Input image data is received at a master node from a semiconductor inspection tool or a semiconductor metrology tool. The input image data is about a semiconductor wafer or reticle. Using the master node, the input image data is divided into at least a first job. Using the master node, the first job is distributed to a first worker node of a plurality of worker nodes in electronic communication with the master node. Each of the worker nodes includes at least one CPU running a worker job manager and at least one GPU in electronic communication with the CPU. The worker job manager is configured to divide a received job into a plurality of tasks. Using the worker job manager in the first worker node, the first job is divided into a plurality of tasks. Using the worker job manager in the first worker node, each of the tasks in the first job is assigned to one of the CPU or one of the GPU in the first worker node. Using the worker job manager in the first worker node, the tasks in the first job are prioritized ahead of tasks in a later job.

In an instance, the input image data can be divided into a second job using the master node. The second job can be distributed to a second worker node of the plurality of the worker nodes using the master node. Using the worker job manager in the second worker node, the second job can be divided into a plurality of tasks. Using the worker job manager in the second worker node, each of the tasks in the second job can be assigned to one of the CPU or one of the GPU in the second worker node.

Each of the worker job managers can includes a module with a deep learning model. The deep learning model can be configured to assign each of the tasks in a received job to one of the CPU or one of the GPU in the worker node. The method can further include retraining the deep learning model.

The worker job managers can operate under a first in first out job queue.

The worker job manager can be configured to assign each of the tasks in a received job to one of the CPU or one of the GPU in the worker node with the worker job manager assigning the tasks to minimize completion time of the tasks.

The input image data can be distributed to the GPUs in equal batches.

The input image data may be from multiple wafer locations. The input image data can be processed in a same batch.

The first job can be distributed to the first worker node in parallel and in real-time. The first job can be distributed to the first worker node as the input image data is acquired in memory.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein include real-time job distribution software architectures for high bandwidth, hybrid processor computation systems that can be used with semiconductor inspection and metrology. The architecture is scalable and the number of CPUs and GPUs can be adjusted to meet the computing needs for any computation bandwidth required to meet cost and system throughput. Thus, the architecture can serve any semiconductor inspection or metrology tool or product platform. In some embodiments, GPU batching can group multiple tasks before dispatching to GPUs for efficient data transfer with minimal latency and efficient utilization of GPU cores.

Embodiments disclosed herein can use a flexible architecture. The architecture can support any type of computation on CPU or GPU, including any number of GPU-bound task types interspaced by conventional algorithms to be run on the CPU. All kinds of task types can be executed either on CPU or GPU. As a result, the architecture can be adapted and customized to most of the inspection and metrology tools that intend to build a hybrid (CPU/GPU) solution. A real-time distributed architecture can distribute jobs in parallel and in real time (e.g., as the image is getting acquired in memory) to multiple processors (e.g., CPUs or GPUs) across multiple nodes with minimal job dispatch latency.

Embodiments of this architecture allow CPU-GPU workloads to be mixed naturally (e.g., CPU task to GPU task to CPU task) within a node or across nodes. It also can provide the capability to have efficient processing for an uneven number of CPUs and GPUs per node. Thus, the number of CPUs per node may be larger or smaller than the number of GPUs per node.

Figure 1A:
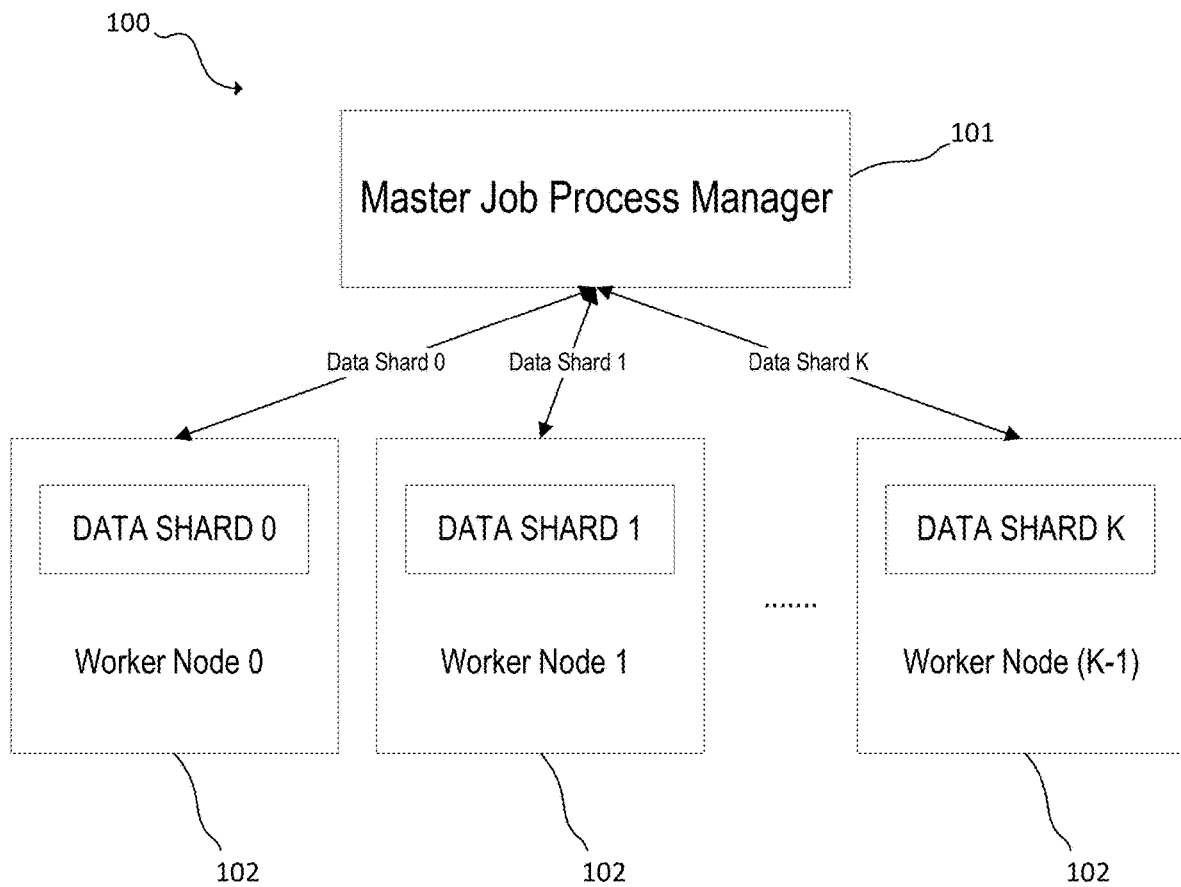
FIG. 1A and FIG. 1B show block diagrams of an embodiment of a system architecture in accordance with the present disclosure, wherein the worker node of FIG. 1B can be used with each of the worker nodes 0, 1, (K−1) in FIG. 1A.
Figure 1B:
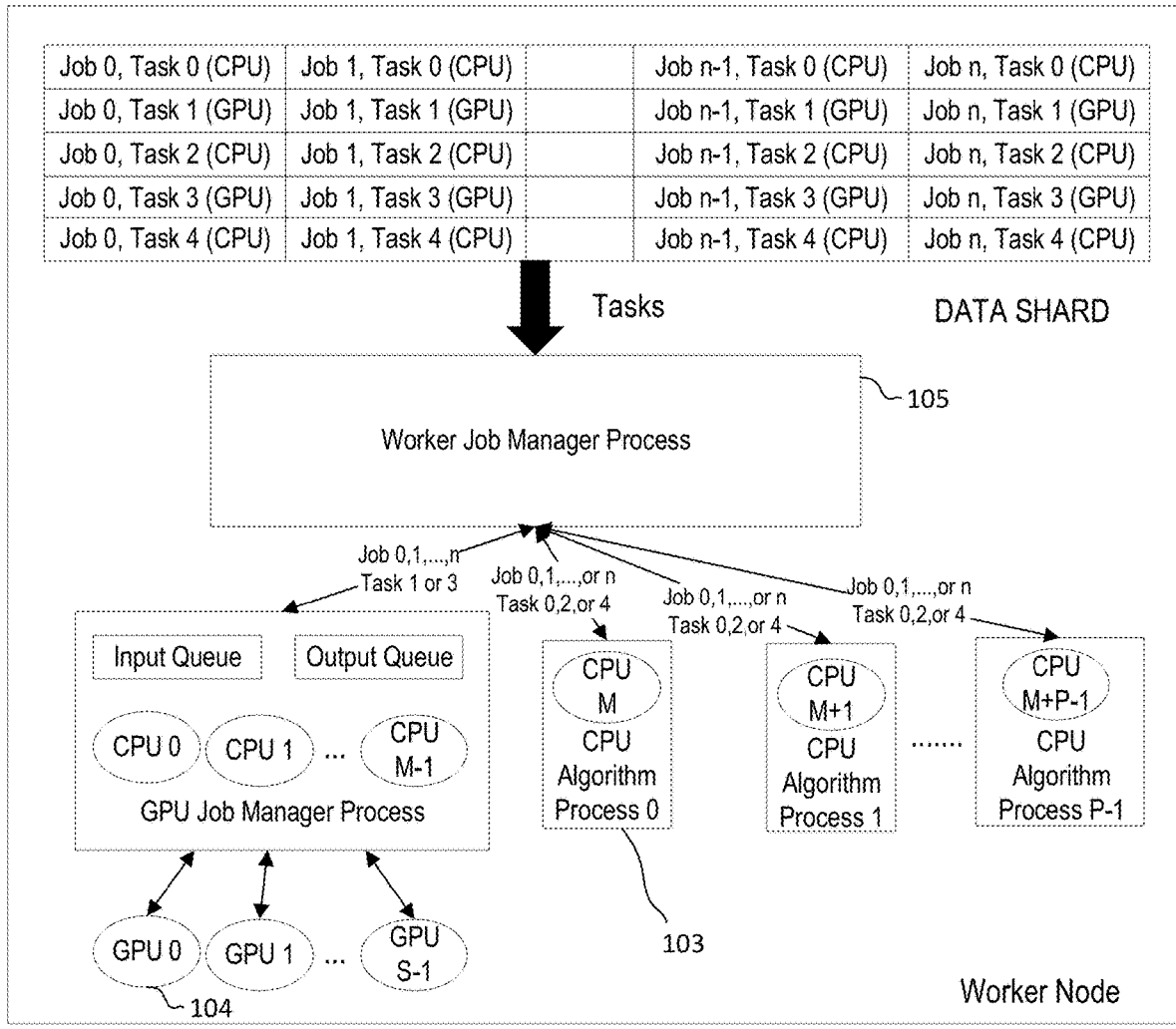

FIG. 1 is a block diagram of an embodiment of a system architecture 100. The system 100 includes a master node 101 and multiple worker nodes 102. The master node 101 and worker nodes 102 can be connected to have bi-directional communication at a speed such as 56 Gbps, such as using a high-speed Infiniband network.

In an instance, the master node 101 includes two Intel x64 processor chips. For example, Broadwell chips with 14 CPU cores per chip may be used. In this example, the master node 101 includes 256 GB of RAM.

The system architecture 100 can include between 1 and 72 worker nodes 102, including any value or range between. In a particular embodiment, the system architecture 101 includes between 2 and 40 worker nodes 102. In yet another particular embodiment, the system architecture includes 18 worker nodes 102.

Each of the worker nodes 102 includes at least one CPU 103 and at least one GPU 104 in electronic communication with the CPU 103. In an instance, a worker node 102 includes two Intel x64 processor chips. For example, Broadwell chips with 10 CPU cores per chip may be used. In this example, the worker node 102 includes 256 GB of RAM.

One of the CPU 103 in each worker node 102 may run a worker job manager 105, such as a GPU job manager. The worker job manager 105 can be run on a separate CPU in the worker node 102. For example, the worker node 102 may include 20 CPUs, one of which runs the worker job manager 105.

The worker job manager 105 can be configured to divide a received job (a data shard) into a plurality of tasks to be processed by the CPU 103 or GPU 104. The received job can be stored locally in the worker node 102. A job consists of multiple tasks, based on logical image processing boundaries. Some of this logical separation is based on whether a CPU or GPU is used to divide the tasks.

The worker job manager 105 also can divide a received job into multiple job. This is a form a data parallelism.

In an instance, one or more worker nodes 102 includes a CPU 103 for running the worker job manager 105 in electronic communication with another CPU 103 in that worker node 102.

Each of the worker job managers 105 can be configured to assign each of the tasks of the received job to one of the CPU 103 or one of the GPU 104 in the worker node 102. The worker job manager 105 may be in the same worker node 102 as the CPU 103 or GPU 104 that each of the tasks is assigned to.

Each of the worker job managers 105 can be configured to determine whether to assign one of the tasks to one of the CPU 103 instead of one of the GPU 104 in the worker node 102 or whether to assign one of the tasks to the GPU 104 instead of one of the CPU 103 in the worker node 102. In an instance, each of the tasks associated with a job has configuration details to control its operation. One of these configuration details can be the processor type for its execution, which can dictate whether a CPU 103 or GPU 104 is used to execute its operation.

The worker job manager 105 then can dispatch multiple CPU bound tasks (e.g., task 0, 2, or 4) corresponding to multiple jobs to CPU-bound algorithm processes and multiple GPU-bound tasks (e.g., task 1 or 3) corresponding to multiple jobs to GPU-bound algorithm processes or a GPU job manager process (not illustrated). For example, task 0 of job indices T to (T+P−1) will be dispatched to P CPU-bound algorithm processes while task 1 or 3 of some of the job indices ≥(T−1) are currently being processed by a GPU job manager process. All the tasks for a given job can execute in a sequential order hopping between CPUs and GPUs where the output of one task is being fed as input to the next task. For example, (as shown in FIG. 1), the task sequence for any of the n jobs would be task 0 (CPU), task 1 (GPU), task 2 (CPU), task 3 (GPU), and task 4 (CPU). However, tasks from job X is not dependent on tasks from job Y. Therefore, tasks from jobs X and Y can execute in parallel as long as CPU and/or GPUs are available for processing.

The GPU job manager can have an internal, parallel work-flow execution mechanism by having separate job queues for each type of GPU-based task execution. In an instance, there are "detection" and "classification" type GPU jobs, and the GPU job manager contains multiple CPU threads (internally) to service those job queues, and a separate CPU thread to process the results output from the GPU processor.

GPU-bound tasks dispatched to a GPU job manager process can be queued in the input queue of the GPU job manager process to allow for batching of input data before being dispatched to GPUs to have higher CPU to GPU data transfer efficiency. The input data may be input image data.

The disclosed architecture is flexible enough to support any type of GPU-bound task. A compute model can be created for an embodiment of this architecture. The compute model can be updated while adding or removing worker nodes or adding or removing GPUs per node.

The system architecture 100 has various operational modes for inspecting wafers. The compute model can be designed for each operation mode based on the unique set of tasks that will be in action for each job. The compute model can have a list of tasks and the compute time for each task based on image input conditions. The compute model can tally up the total processing time of all tasks. Based on this time, the number of CPU and GPU processors, and the total number of nodes can be determined, to meet the required input image rate.

Input data can be transferred across nodes using, for example, high speed InfiniBand links.

Other embodiments of this architecture are possible. For example, only some of the worker nodes contain both CPUs and GPUs and the remaining worker nodes only contain CPUs. In another example, there are dedicated worker nodes for CPU-bound and GPU-bound tasks.

Figure 3:
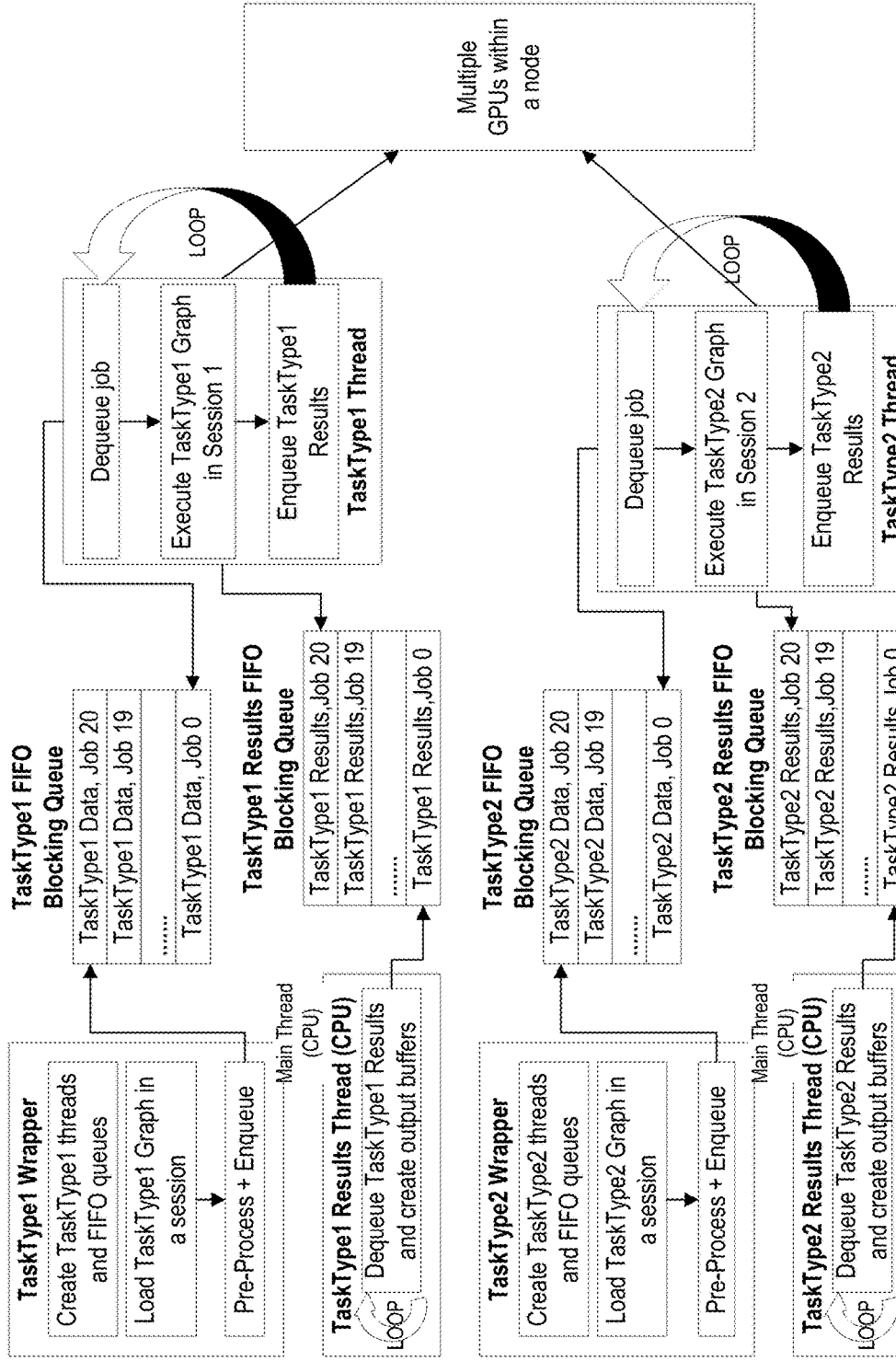
FIG. 3 is a detailed diagram of an embodiment of the GPU job manager architecture for executing multiple GPU tasks in accordance with the present disclosure.
Figure 5:
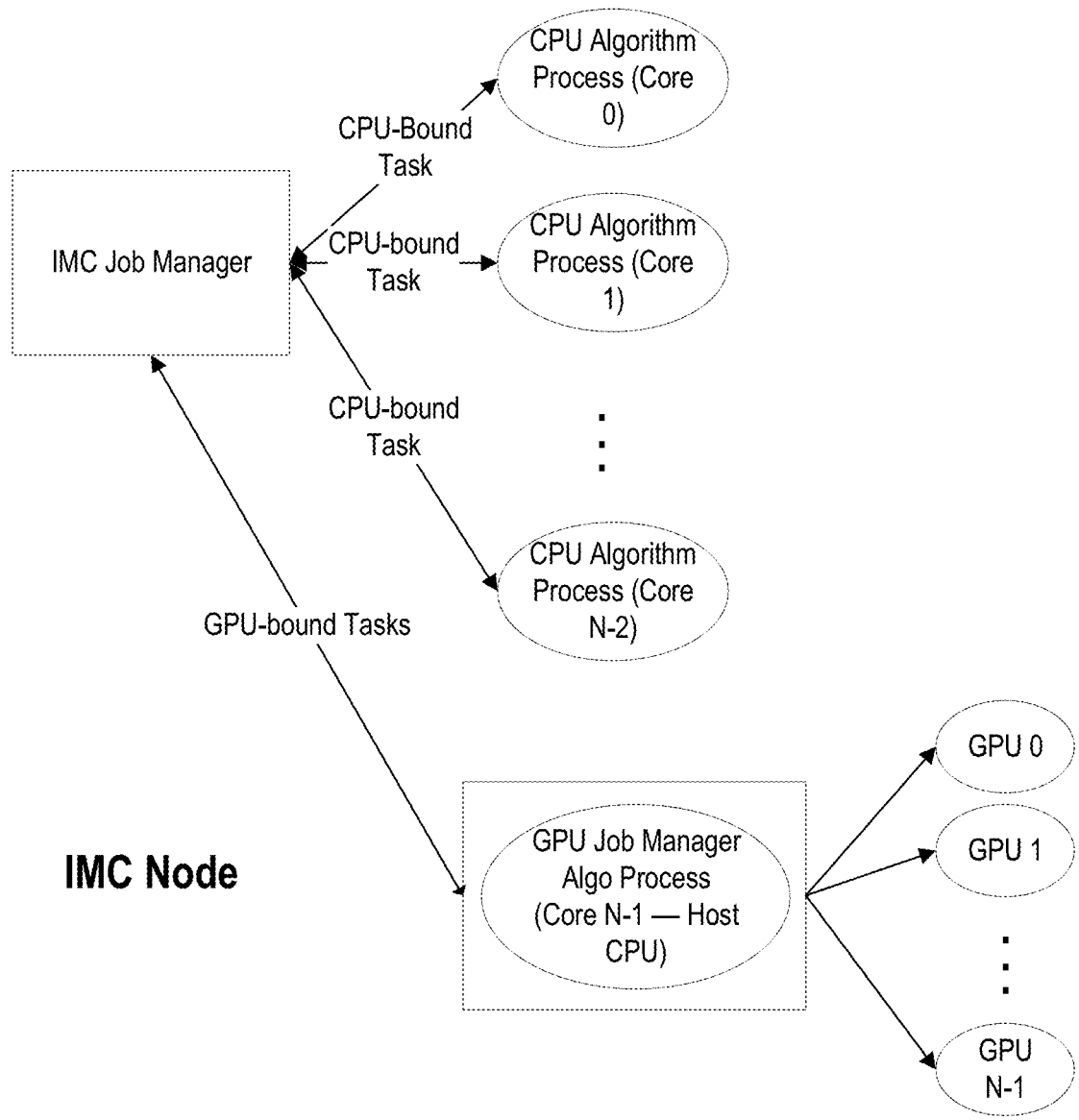
FIG. 5 is a diagram of an embodiment of a hybrid image computer (IMC) software architecture in accordance with the present disclosure.

Embodiments of this architecture can support multiple task types while going back and forth between CPUs and GPUs. The GPU job manager data flow is shown in FIG. 3 and shows how the data flows through the GPU job manager software stack running on single host CPU and multiple GPUs within a single node. The GPU job manager architecture shown in FIG. 5 illustrates the flexibility and scalability of the embodiments.

The master node 101 is in electronic communication with the worker nodes 102. The master node 101 can receive input data about a semiconductor wafer or reticle, such as input image data. The master node 101 can be configured to divide the input data into at least a first job and distribute the first job to one of the worker nodes 102. A master job manager running on the master node 101 can divide (shard) the input data into jobs (data shards). Each job is sent to one of the worker nodes 102 using the master job manager in the master node 101.

Each job can correspond to a site on the wafer and can have a site index related to it. When dividing the input data into jobs, the master node job manager can dispatch jobs to worker nodes to maximize load balancing across the entire image computer system. This can ensure that all tasks associated with a site/job are sent to a single worker node, which minimizes any cross traffic between the worker nodes to process a single site job.

In swathing architectures, the input data would be divided by the worker nodes 102 directly without the master node 101 to avoid data transfer latency.

The master node 101 may be in electronic communication with a processing tool, such as a semiconductor inspection or semiconductor metrology tool. For example, the master node 101 may be in electronic communication with a scanning electron microscope (SEM), optical microscope, broad band plasma (BBP) tool, or other semiconductor inspection or metrology tools.

Each of the worker job managers 105 can be further configured to prioritize the tasks in the first job ahead of tasks in a later job.

The master node 101 can be further configured to divide the input data into a second job and distribute the second job to one of the worker nodes 102. This may be the same worker node 102 that received the first job or a different worker node 102.

The composition of each worker node 102 can vary. There may be more CPU 103 than GPU 104 in a worker node 102, there may be the same number of CPU 103 and GPU 104 in a worker node, or there may be more GPU 104 than CPU 103 in a worker node 102. While illustrated as having the same composition in FIG. 1, one or more worker nodes 102 may have a different composition of CPU 103 and GPU 104. In an instance, each of the worker nodes 102 can have a different composition of CPU 103 and GPU 104.

In an instance, there may be 20 or more CPUs and from 1 to 4 GPUs in a worker node 102. Generally, there are more CPUs than GPUs in a worker node 102, though other configurations are possible.

The system 100 may include at least one CPU worker node in electronic communication with the master node 101. The CPU worker node includes one or more CPU, one of which runs a worker job manager 105. The CPU worker node does not include GPU.

The system 100 may include at least one GPU worker node in electronic communication with the master node 101. The GPU worker node includes one or more GPU. The GPU worker node does not include CPU or only includes CPU to run a worker job manager 105.

The system 100 may include an interface layer that can be configured to communicate with an IMC client using an application programming interface.

In an embodiment, each of the worker job managers 105 includes a module with a deep learning model. The deep learning model can be configured to assign each of the tasks in the received job to one of the CPU 103 or one of the GPU 104 in the worker node 102. Whether the deep learning model assigns a task to a CPU 103 or GPU 104 can be a predetermined setting in the configuration file.

For a given operational mode of inspection, there will be corresponding deep learning model or model. The model or set of models can be loaded onto each worker node's CPU or GPU based on that task configuration. In an instance, the deep learning model is executed on the GPU instead of the CPU.

In an embodiment, a neural network is in electronic communication with the GPU 104. For example, the neural network can be deployed on GPU 104 or a CPU to execute the deep learning model for the corresponding image processing task.

Using embodiment disclosed herein, GPU-bound task types can be executed. A thin wrapper or interface layer which communicates with IMC client software using various application program interfaces may be used. This wrapper can initialize a given task type, provide images and algorithm parameters as inputs for execution, and output the results from the execution. An input first in, first out (FIFO) queue can be used. For each network, an input FIFO queue may be created to buffer the input data such that the data is always available to be fed to one or more GPUs in order to execute a specific task type in batch mode. The data can be enqueued into the input data queue using the image computer client thread and dequeued by a processing thread (blocking on the input queue) which further transfers the data to one or more GPUs for execution. The IMC client thread may be active and can keep enqueing future data while the GPU is busy processing the current data. The IMC thread can be kept alive even though the processing thread blocks and waits for the GPUs to complete processing. After the processing is completed by the GPU, the task results may be enqueued into an output FIFO queue by the processing thread. The results thread (which is blocking on the output FIFO queue) can dequeue the output data and copies the output in the image computer shared memory.

Figure 4:
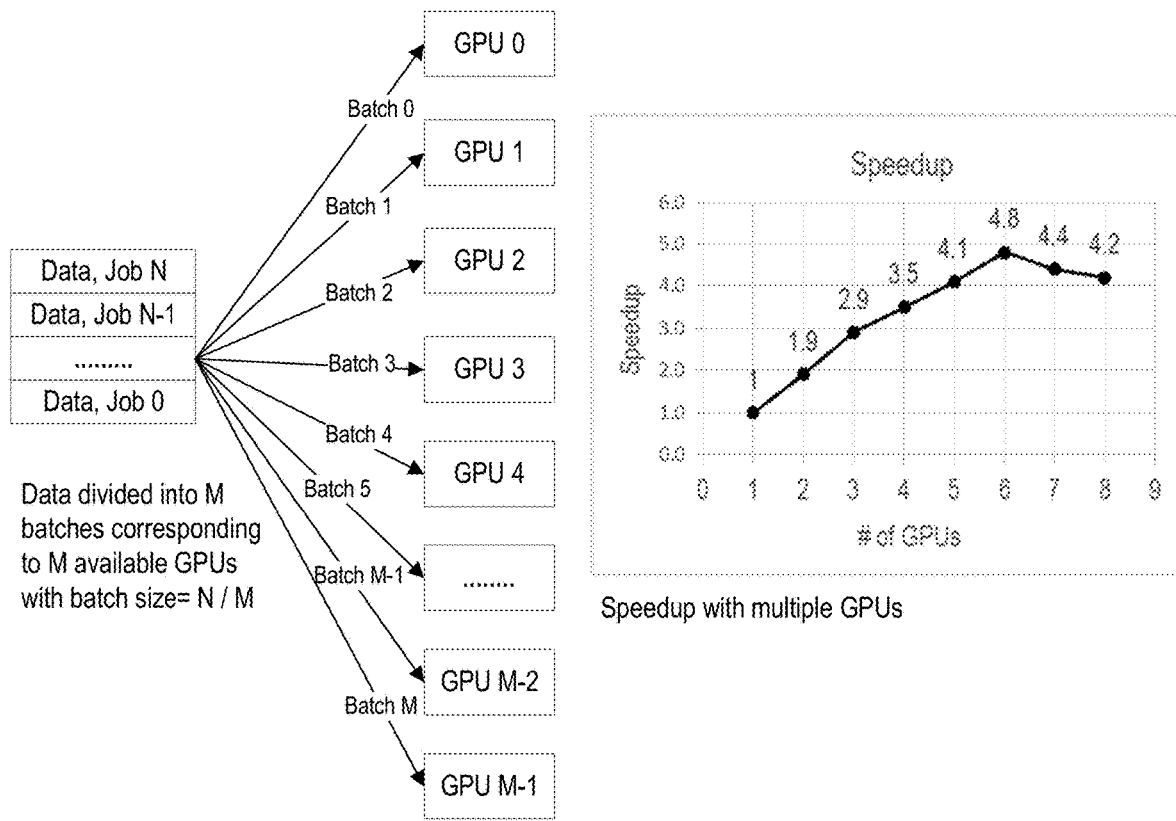
FIG. 4 is diagram showing scalability via data parallelism.

Embodiments of the architecture disclosed herein can enable the addition of new GPU-bound task types to be executed with minimal implementation effort. Two GPU-bound task types can be executed with an option of executing only task type 1 or executing both task type 1 and task type 2 within the same job. Addition of new GPU-bound task types for execution on one or more GPUs can be performed, as shown in FIG. 4, which is diagram showing scalability via data parallelism. For any new task type that is added to the GPU job manager, the architecture may include: a wrapper for interfacing with an IMC client to initialize and enqueue the data; an input data FIFO queue; a processing thread for GPU execution; an output results FIFO queue; and a results thread for publishing the results to the IMC client.

FIG. 4 shows boxes corresponding to modules disclosed herein. Task type 1 are on the left and all the boxes for task type 2 are on the right. For maximal performance efficiency and load balancing, the architecture is flexible in pinning each of the neural nets to separate GPUs or use all the GPUs for a single neural net using data parallelism. The architecture may allocate one or more CPUs to a specified list of GPUs to prevent CPUs from becoming a bottleneck while feeding the input data to GPUs.

In an instance, a user specifies the list of GPUs to be used for a given neural network and the architecture can automatically divide the input data in equal batches and dispatch those batches to all the GPUs specified in the list. This is seen in FIG. 5. Thus, the number of GPUs using data parallelism can be scaled.

Embodiments disclosed herein can allow input image data from multiple wafer sites or locations to be processed in the same batch to fully utilize the GPU.

A mix of CPU-GPU workloads or tasks can be performed with embodiments of the architecture disclosed herein. This hybrid architecture can, for example, run a sequence of a CPU task, a GPU task, and a CPU task. This can provide efficient processing for an uneven number of CPUs and GPUs per node. For example, the number of CPUs may be large or smaller than the number of GPUs in a node and data processing times are not impacted.

Jobs can be distributed in parallel and in real time. Thus, the jobs can be distributed to multiple processors (e.g., CPUs or GPUs) across multiple nodes as the image is acquired in memory with minimal job dispatch latency.

Input/output intermediate data can be read or written to disk instead of keeping the data in memory. This may affect efficiency due to disk input/output, but may provide acceptable processing performance.

In an embodiment, there is at least one dedicated node for CPU processing and/or at least one dedicated node for GPU processing. Hybrid processing occurs across nodes instead of having hybrid processing within a given node. Thus, a GPU-bound task is dispatched to a dedicated GPU node and a CPU-bound task is dispatched to the dedicated CPU node. In instance, all the GPU-bound tasks are dispatched to a dedicated GPU node and all the CPU-bound tasks are dispatched to the dedicated CPU node. An internal communications network (e.g., InfiniBand) may be used for data transfer.

Deep learning based inspection and metrology systems for semiconductor wafers may be enabled by architecture embodiments disclosed herein. Thus, embodiments disclosed herein can be utilized in inspection and metrology systems.

Figure 2:
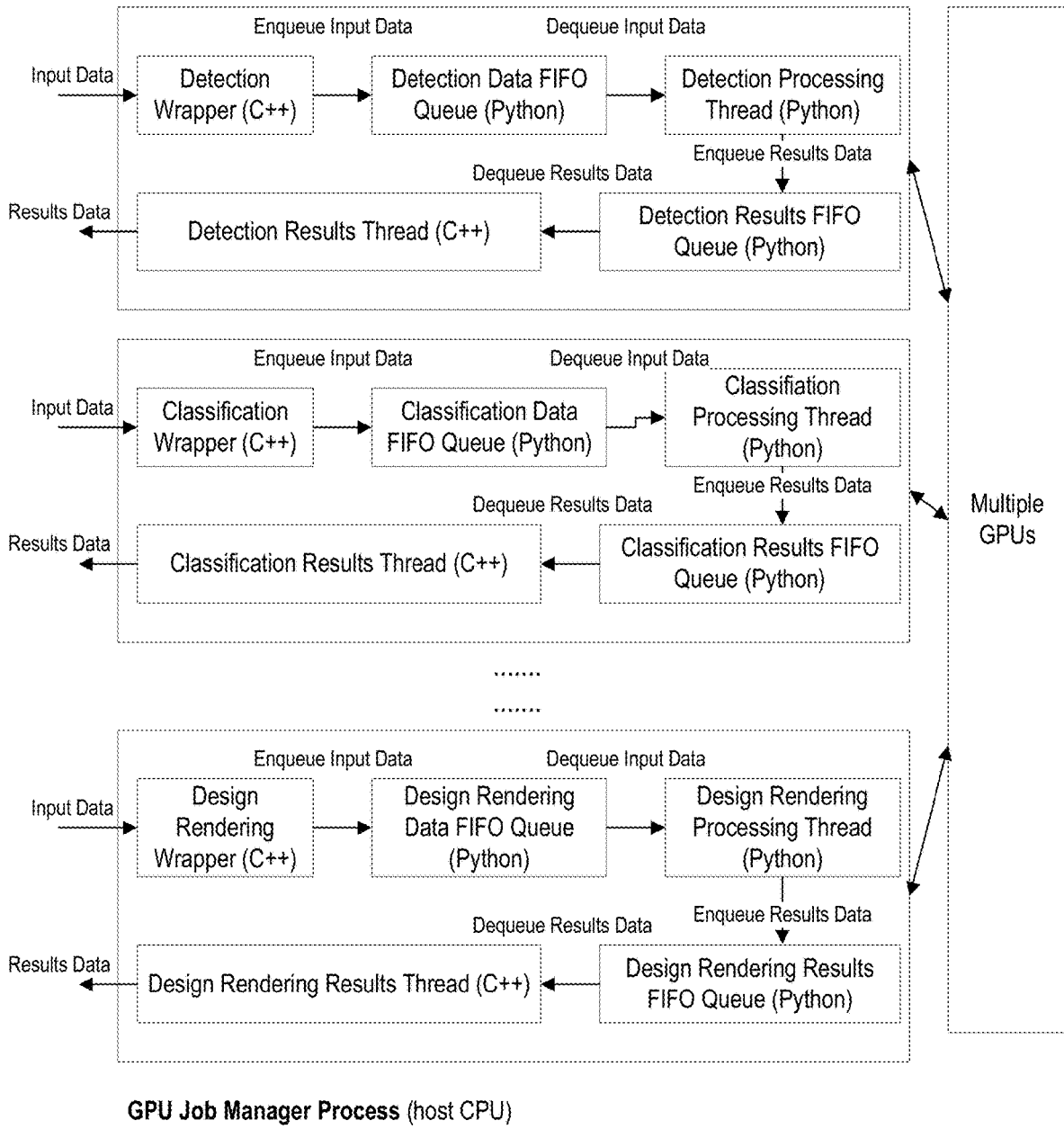
FIG. 2 is a diagram of an embodiment of the GPU job manager architecture in accordance with the present disclosure.

FIG. 2 is a diagram of an embodiment of the GPU job manager architecture. FIG. 2 describes how multiple types of GPU-based tasks can be executed within a single job management infrastructure using multiple GPU processors.

FIG. 3 is another diagram of an embodiment of the GPU job manager architecture for executing multiple GPU tasks. FIG. 3 shows various software interfaces to the GPU job manager with the internal job dispatch and results handling queues to handle various types of GPU-based tasks in a job.

Figure 6:
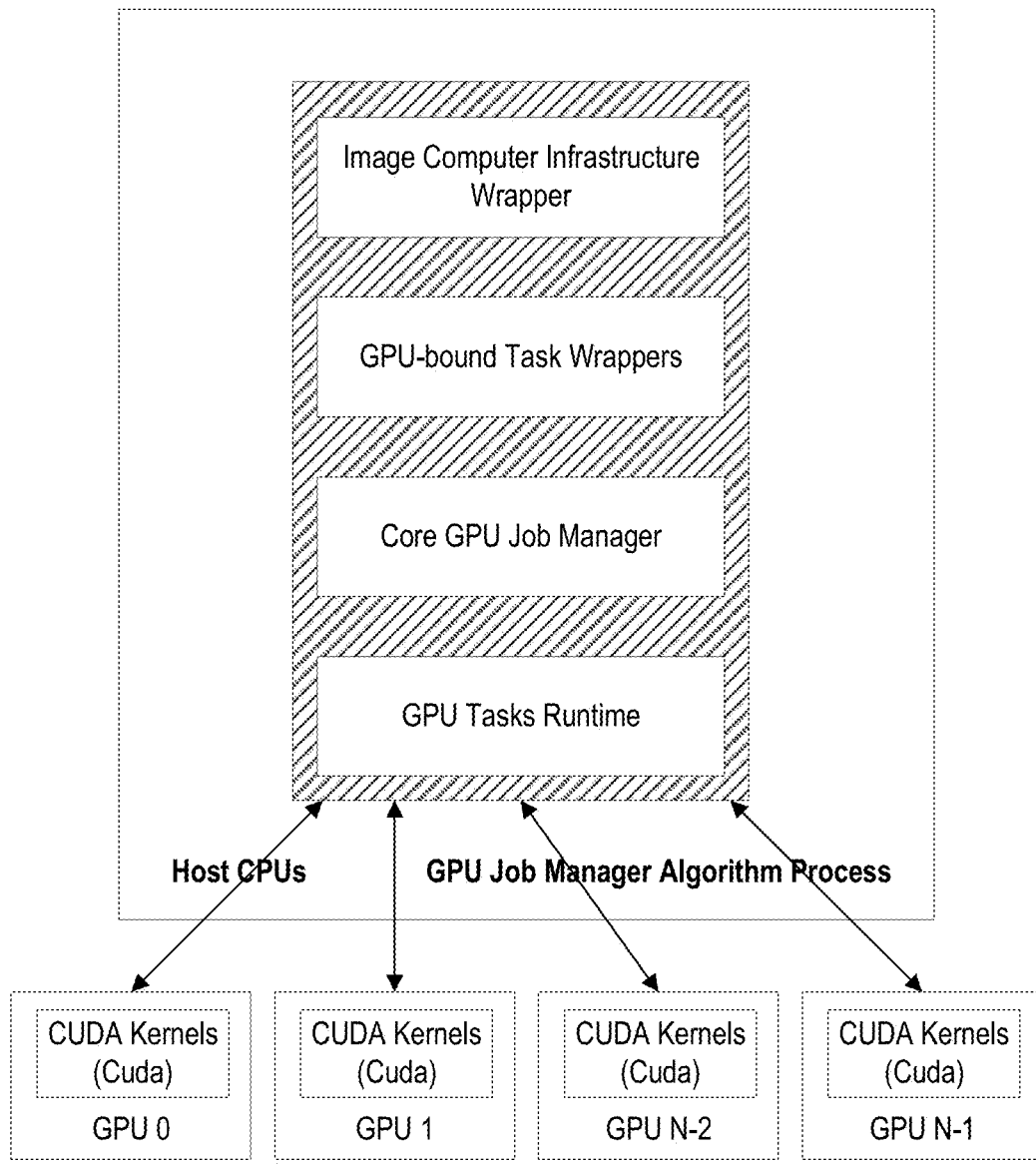
FIG. 6 is a diagram of a GPU job manager's algorithm process software stack in accordance with the present disclosure.

FIG. 6 is a diagram of a GPU job manager software stack. The software stack can be a layered architecture that manages the workflow efficiently with the worker job manager.

Figure 7:
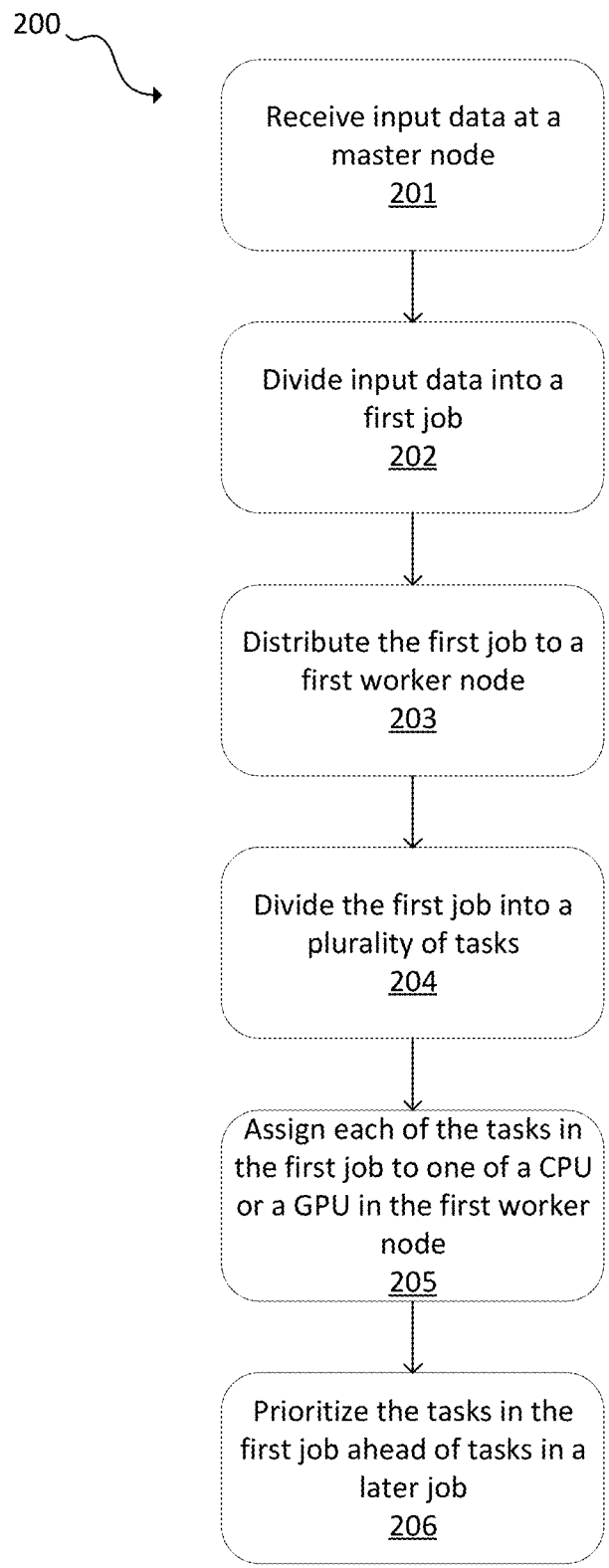
FIG. 7 is a flowchart of a method in accordance with the present disclosure.

FIG. 7 is a flowchart of a method 200. The method 200 enables a real-time job distribution software architecture for high bandwidth, hybrid processor, computational systems, such as those for semiconductor inspection and metrology. The method 200 can be scalable and flexible, and may use GPU batching.

In the method 200, input data is received at a master node at 201, such as input image data. The input data may be from a semiconductor inspection tool or a semiconductor metrology tool. In an instance, the input data is about a semiconductor wafer or reticle. The input data may be from an optical camera or an electron beam scanning system. Each of these sources may include multiple channels of data from the corresponding image sensor.

At 202, the input data is divided into at least a first job using the master node.

The first job is distributed to a first worker node of a plurality of worker nodes in electronic communication with the master node at 203 using the master node. Each of the worker nodes includes at least one CPU running a worker job manager and at least one GPU in electronic communication with the CPU. The worker job manager is configured to divide a received job into a plurality of tasks.

Using the worker job manager in the first worker node, the first job is divided into a plurality of task at 204.

At 205, each of the tasks in the first job is assigned to one of the CPU or one of the GPU in the first worker node using the worker job manager in the first worker node.

The tasks in the first job are prioritized ahead of tasks in a later job using the worker job manager in the first worker node at 206.

In an instance, the input data is divided into a second job using the master node. The second job is distributed to a second worker node of the plurality of the worker nodes using the master node. Using the worker job manager in the second worker node, the second job is divided into a plurality of tasks. Each of the tasks in the second job is assigned to one of the CPU or one of the GPU in the second worker node using the worker job manager in the second worker node.

Each of the worker job managers can include a module with a deep learning model. The deep learning model is configured to assign each of the tasks in a received job to one of the CPU or one of the GPU in the worker node. If a deep learning model is present, the method 100 can include retraining the deep learning model. The deep learning model may be a neural network, which is configured to process images for feature detection and classification. The deep learning model can be obtained from a training operation. During training, a large set of input image data from the wafer or reticle is presented to the neural network with the desired output result for each of the image in that set. A training operation can be completed using a deep learning software application, and the result of this training is the model, which can then be used to produce desired output on any input image set.

The worker job managers can operate under a first in first out job queue.

The worker job manager can be configured to assign each of the tasks in a received job to one of the CPU or one of the GPU in the worker node with the worker job manager assigning the tasks to minimize completion time of the tasks.

The input data may be distributed to the GPUs in equal batches.

The input data may be from multiple wafer locations, and wherein the input data is processed in a same batch.

The first job may be distributed to the first worker node in parallel and in real-time. Thus, the first job can be distributed to the first worker node as the input data is acquired in memory.

An additional embodiment relates to a non-transitory computer-readable medium storing program instructions executable on a controller for job distribution, as disclosed herein. In particular, a master node or worker node can be coupled to a memory in an electronic data storage medium with non-transitory computer-readable medium that includes executable program instructions. The computer-implemented method may include any step(s) of any method(s) described herein. For example, the master node, worker node, or other parts of the system may be programmed to perform some or all of the steps of FIG. 7. The memory in the electronic data storage medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), Streaming SIMD Extension (SSE), or other technologies or methodologies, as desired.

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities.

A wafer may include one or more layers formed upon a substrate. For example, such layers may include, but are not limited to, a resist, a dielectric material, and a conductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features. Formation and processing of such layers of material may ultimately result in completed devices. Many different types of devices such as ICs may be formed on a wafer, and the term wafer as used herein is intended to encompass a wafer on which any type of device known in the art is being fabricated. As used herein, the term "chip" may comprise a collection of ICs designed for a particular purpose.

Although embodiments are described herein with respect to wafers, it is to be understood that the embodiments may be used for another specimen such as a reticle, which may also be commonly referred to as a mask or a photomask. Many different types of reticles are known in the art, and the terms "reticle," "mask," and "photomask" as used herein are intended to encompass all types of reticles known in the art.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system for scalable and flexible job distribution having a plurality of worker nodes coupled to a master node comprising:
    the master node having at least one processor to run a master job manager, wherein the master job manager is configured to:
        receive input image data from a semiconductor inspection tool or a semiconductor metrology tool, wherein the input image data is of a semiconductor wafer or reticle;
        divide the input image data into at least a first job; and
        distribute the first job to a first CPU worker node of the plurality of worker nodes;
    the plurality of worker nodes including:
        the first CPU worker node coupled with the master node, wherein the first CPU worker node includes two or more CPUs and two or more GPUs, wherein one of the CPUs in the first CPU worker node runs a worker job manager for the first CPU worker node, wherein the worker job manager includes a module with a deep learning model;
        a second CPU worker node coupled with the master node that includes one or more CPUs without any GPU; and
        at least one GPU worker node coupled with the master node that includes one or more GPUs without any CPU other than to run the worker job manager for the GPU worker node;
    wherein the worker job manager of the first CPU worker node is configured to divide the first job into a plurality of tasks to be processed by the two or more CPUs or the two or more GPUs based on logical image processing boundaries, wherein the plurality of tasks include defect detection and defect classification;
    wherein the deep learning model of the first CPU worker node is configured to:
        determine whether each of the tasks is a CPU-bound task or a GPU-bound task based on the logical image processing boundaries, wherein the CPU-bound task is assigned to one of the two or more CPUs in the first CPU worker node instead of to one of the two or more GPUs in the first CPU worker node, and wherein the GPU-bound task is assigned to one of the two or more GPUs in the first CPU worker node instead of to one of the two or more CPUs in the first CPU worker node;
    wherein the worker job manager of the first CPU worker node is further configured to:
    dispatch the CPU-bound tasks for CPU-bound algorithm processes and the GPU-bound tasks for GPU-bound algorithm processes or for a GPU job manager; and
    wherein the GPU job manager of the first CPU worker node is configured to:
        queue in an input queue the input image data of at least some of the GPU-bound tasks for the GPU job manager to prioritize ahead of a later GPU bound-task; and
        distribute the input image data of the at least some of the GPU-bound tasks in equal batches to the two or more GPUs of the first CPU worker node for processing such that completion time of the plurality of tasks is minimized.

2. The system of claim 1, wherein there are more of the CPU than the GPU in one of the worker nodes.

3. The system of claim 1, wherein there are more of the GPU than the CPU in one of the worker nodes.

4. The system of claim 1, wherein the master node is further configured to divide the input image data into a second job and to distribute the second job to one of the plurality of worker nodes.

5. The system of claim 1, wherein one of the CPU in the second CPU worker node runs the worker job manager for the second CPU worker node.

6. The system of claim 1, further comprising an interface layer configured to communicate with an integrated memory controller (IMC) client using an application programming interface.

7. The system of claim 1, further comprising a neural network to execute the deep learning model.

8. A method for scalable and flexible job distribution having a plurality of worker nodes coupled to a master node comprising:
- receiving input image data from a semiconductor inspection tool or a semiconductor metrology tool at the master node, wherein the input image data is of a semiconductor wafer or reticle, and wherein the master node has a master job manager;
- dividing the input image data into at least a first job using the master job manager;
- distributing, using the master job manager, the first job to a first CPU worker node of the plurality of worker nodes coupled with the master node, wherein the plurality of worker nodes includes:
- the first CPU worker node that includes two or more CPUs and two or more GPUs, wherein one of the CPUs in the first CPU worker node runs a worker job manager for the first CPU worker node, wherein the worker job manager includes a module with a deep learning model;
- a second CPU worker node coupled with the master node that includes one or more CPUs without any GPU; and
- at least one GPU worker node coupled with the master node that includes one or more GPUs without any CPU other than to run the worker job manager for the GPU worker node;
- dividing, using the worker job manager of the first CPU worker node, the first job into a plurality of tasks to be processed by the two or more CPUs or the two or more GPUs based on logical image processing boundaries, wherein the plurality of tasks include defect detection and defect classification;
- determining, using the deep learning model of the first CPU worker node, whether each of the tasks is a CPU-bound task or a GPU-bound task based on the logical image processing boundaries, wherein the CPU-bound task is assigned to one of the two or more CPUs in the first CPU worker node instead of to one of the two or more GPUs in the first CPU worker node, and wherein the GPU-bound task is assigned to one of the two or more GPUs in the first CPU worker node instead of to one of the two or more CPUs in the first CPU worker node;
- dispatching, using the worker job manager of the first CPU worker node, the CPU-bound tasks for CPU-bound algorithm processes and the GPU-bound tasks for GPU-bound algorithm processes or for a GPU job manager;
- queuing, using the GPU job manager of the first CPU worker node, in an input queue the input image data of at least some of the GPU-bound tasks for the GPU job manager to prioritize ahead of a later GPU bound-task; and
- distributing, using the GPU job manager of the first CPU worker node, the input image data of the at least some of the GPU-bound tasks in equal batches to the two or more GPUs of the first CPU worker node for processing such that completion time of the plurality of tasks is minimized.

9. The method of claim 8, wherein the method further comprises retraining the deep learning model.

10. The method of claim 8, wherein the worker job managers operate under a first in first out job queue.

11. The method of claim 8, wherein the input image data is from multiple wafer locations, and wherein the input image data is processed in a same batch.

12. The method of claim 8, wherein the first job is distributed to the first CPU worker node in parallel and in real-time with other jobs from the input image data distributed to the plurality of worker nodes.

13. The method of claim 12, wherein the first job is distributed to the first CPU worker node as the input image data is acquired in memory.

* * * * *